(12) United States Patent
Mo

(10) Patent No.: US 11,976,712 B2
(45) Date of Patent: May 7, 2024

(54) TRANSMISSION

(71) Applicant: Dechao Mo, Yulin (CN)

(72) Inventor: Dechao Mo, Yulin (CN)

(*) Notice: Subject to any disclaimer, the term of this patent is extended or adjusted under 35 U.S.C. 154(b) by 201 days.

(21) Appl. No.: 17/571,653

(22) Filed: Jan. 10, 2022

(65) Prior Publication Data

US 2022/0128138 A1 Apr. 28, 2022

Related U.S. Application Data

(63) Continuation of application No. PCT/CN2020/000150, filed on Jul. 13, 2020.

(30) Foreign Application Priority Data

Aug. 28, 2019 (CN) .......................... 201910804915.0

(51) Int. Cl.
F16H 37/02 (2006.01)
B25J 9/10 (2006.01)
F16H 49/00 (2006.01)

(52) U.S. Cl.
CPC ............ F16H 37/02 (2013.01); B25J 9/1025 (2013.01); F16H 49/001 (2013.01)

(58) Field of Classification Search
CPC ........ F16H 37/02; F16H 49/001; B25J 9/1025
See application file for complete search history.

(56) References Cited

U.S. PATENT DOCUMENTS

| 1,616,369 A | 2/1927 | Ludwig |  |
| 4,326,748 A | 4/1982 | Brusasco |  |
| 4,476,735 A * | 10/1984 | Cantwell | F16H 25/06 74/122 |
| 4,798,104 A * | 1/1989 | Chen | F16H 25/06 475/159 |
| 5,042,322 A * | 8/1991 | Hofmann | F16H 49/001 475/168 |
| 2009/0205451 A1* | 8/2009 | Bayer | F16H 25/06 74/439 |

(Continued)

FOREIGN PATENT DOCUMENTS

| CN | 1048252 A | * | 1/1991 | ............. F16H 25/06 |
| CN | 1119886 A | * | 4/1996 | ............. F16H 25/06 |

(Continued)

OTHER PUBLICATIONS

CN 1119886 A (Folino, F) Apr. 3, 1996 (full text). [online] [retrieved on Sep. 22, 2023]. Retrieved from: Clarivate Analytics. (Year: 1996).*

(Continued)

*Primary Examiner* — Joseph Brown

(57) ABSTRACT

A transmission, including an outer shell (1), an inner shell (2), a drive disk (3), a plurality of T-shaped teeth (4), a gear (5), a tooth seat (6), an adjustable nut (7), balls (8), inner balls (9), outer balls (10), an inner protective frame (11), an outer protective frame (12), rollers (13), a first sealing ring (14), a second sealing ring (15) and a third sealing ring (16). Transmission clearance can be adjusted freely at any time, the meshing of the T-shaped tooth and the gear is a real surface meshing, and almost all the teeth participate in force transmission simultaneously. Therefore, the transmission has high precision, high mechanical properties, and long service life.

2 Claims, 4 Drawing Sheets

(56) References Cited

U.S. PATENT DOCUMENTS

2016/0047452 A1* 2/2016 Jensen ................. F16H 49/001
                                                      74/640
2019/0285152 A1* 9/2019 Igi ......................... F16H 25/06

FOREIGN PATENT DOCUMENTS

| CN | 1545600 A    |   | 11/2004 |
|----|--------------|---|---------|
| CN | 1582371 A    |   | 2/2005  |
| DE | 3834344 A1   | * | 4/1990  |
| DE | 3930064 A1   | * | 3/1991  |
| DE | 69612597 T2  |   | 5/2002  |
| EP | 0985492 A2   | * | 3/2000  |
| JP | H053713 U    | * | 1/1993  |
| JP | 2003042240 A |   | 2/2003  |

OTHER PUBLICATIONS

DE 3930064 A1 (Willi Hempelmann) Mar. 21, 1991 (full text). [online] [retrieved on Sep. 22, 2023]. Retrieved from: Clarivate Analytics. (Year: 1991).*

Internation Search Report of PCT/CN2020/000150, dated Sep. 29, 2020.

* cited by examiner

TRANSMISSION

CROSS-REFERENCE TO RELATED APPLICATIONS

This application is a continuation of International Patent Application No. PCT/CN2020/000150 with a filing date of Jul. 13, 2020, designating the United States, now pending, and further claims priority to Chinese Patent Application No. 201910804915.0 with a filing date of Aug. 28, 2019. The content of the aforementioned applications, including any intervening amendments thereto, are incorporated herein by reference.

TECHNICAL FIELD

The present disclosure relates to a transmission, in particular to a transmission with low backlash, long lifetime and high mechanical properties.

BACKGROUND

In the field of robotic joint transmissions and multi-axis CNC machine tools, transmission with low backlash and high mechanical properties is a key equipment. Among the available equipment, RV cycloidal gear transmission and harmonic transmission are the most representative. However, the RV cycloidal gear transmission has strict requirements of manufacturing material and extremely high requirements of precision, etc., and has a complex structure and high manufacturing cost. In addition, this type of transmission cannot adjust the transmission clearance. The transmission clearance will increase due to wear after working for a certain period of time. The transmission will be scrapped when the transmission clearance exceeding the tolerance of the system. The harmonic transmission uses flexible gear transmission, the flexible components of which have a shorter life and a lower mechanical performance.

SUMMARY

The objective of the present disclosure is to provide a transmission with low backlash, long lifetime and high mechanical properties. The present disclosure adopts the following technical solutions:

1. A transmission, including an outer shell (1), an inner shell (2), a drive disk (3), a plurality of T-shaped teeth (4), a gear (5), a tooth seat (6), an adjustable nut (7), balls (8), inner balls (9), outer balls (10), an inner protective frame (11), an outer protective frame (12), rollers (13), a first sealing ring (14), a second sealing ring (15) and a third sealing ring (16).

2. An upper part of the outer shell (1) is provided with a thread, the thread fits the adjustable nut (7); a middle part of the outer shell (1) is rigidly connected with the tooth seat (6) as a whole, and a lower part of the outer shell (1) is provided with a roller raceway fitting the rollers (13).

3. An upper part of the inner shell (2) fits the second sealing ring (15), and a lower part of the inner shell (2) is fixed on the gear (5).

4. An upper part of the drive disk (3) fits the first sealing ring (14) and the second sealing ring (15); and a ball raceway is formed on an outside of a middle part of the drive disk (3) to fit the balls (8); a lower bottom surface of the drive disk (3) is provided with an inner raceway and an outer raceway; a part of the inner raceway is provided with the inner protective frame (11), and a part of the outer raceway is provided with the outer protective frame (12); the inner protective frame (11) faces to the outer protective frame (12); the inner balls (9) fit the inner raceway, the outer balls (10) fit the outer raceway.

5. The inner protective frame (11) and the outer protective frame (12) are provided on the drive disk (3) and configured to hold the inner balls (9) and the outer balls (10) and prevent the inner balls (9) and the outer balls (10) from contacting the T-shaped teeth (4).

6. The inner balls (9) fit the drive disk (3), and contact with the T-shaped teeth (4) in sections of the inner raceway without the inner protective frame; and the outer balls (10) fit the drive disk (3), and contact with the T-shaped teeth (4) in sections of the outer raceway without the outer protective frame.

7. A top of the T-shaped teeth (4) is provided with lower raceways, which fit the inner balls (9) and the outer balls (10); and a middle part of the T-shaped tooth (4) passes through and fits the tooth seat (6); and a lower end part of the T-shaped tooth (4) is a tooth with a cylindrical spiral surface, which meshes with the gear (5).

8. The gear (5) has teeth with cylindrical spiral surface, which meshes with the T-shaped teeth (4), and an outside of a middle part of the gear (5) is provided with a roller raceway, which fits the rollers (13), and an outside of a lower part of the gear (5) fits the third sealing ring (16).

9. The adjustable nut (7) fits the outer shell (1), the first sealing ring (14), and the balls (8); transmission clearance of all transmission components in the transmission is capable of being adjusted by rotating the adjustable nut (7).

10. Characteristic curves of sections of the inner raceway without the inner protective frame, sections of the outer raceway without the outer protective frame and lower raceways on the T-shaped tooth (4) are cylindrical helical curves; the inner raceway and the outer raceway have different rotation directions and same pitch; sections of the inner raceway provided with the inner protective frame and sections of the outer raceway provided with the outer protective frame are smoothly raised, and respectively fit the inner protective frame and the outer protective frame, such that the inner balls at the sections of the inner raceway without the inner protective frame and the outer balls at the sections of the outer raceway without the outer protective frame smoothly rise and get out of contact with the T-shaped teeth (4).

11. When a number of the T-shaped teeth (4) is n, a number of teeth of the gear (5) is 2n+1 or 2n−1; a rotation direction of the gear (5) with the number of teeth of 2n+1 is different from a rotation direction of the gear (5) with the number of teeth of 2n−1.

12. The gear (5) and T-shaped tooth (4) have same tooth profile of cylindrical helix surface, and a pitch of the cylindrical helix surface is equal to a product of a pitch of a cylindrical helical curve of the drive disk (3) or the T-shaped tooth (4) and a number of teeth of the gear (5); and a speed ratio of the transmission is equal to the number of teeth of the gear (5).

BRIEF DESCRIPTION OF THE DRAWINGS

The present disclosure will be fully understood through the following detailed description in conjunction with the accompanying drawings. The following drawings are not intended to limit the present disclosure, but only for the convenience of explanation and understanding.

DETAILED DESCRIPTION OF PREFERRED EMBODIMENTS

Figure 1:
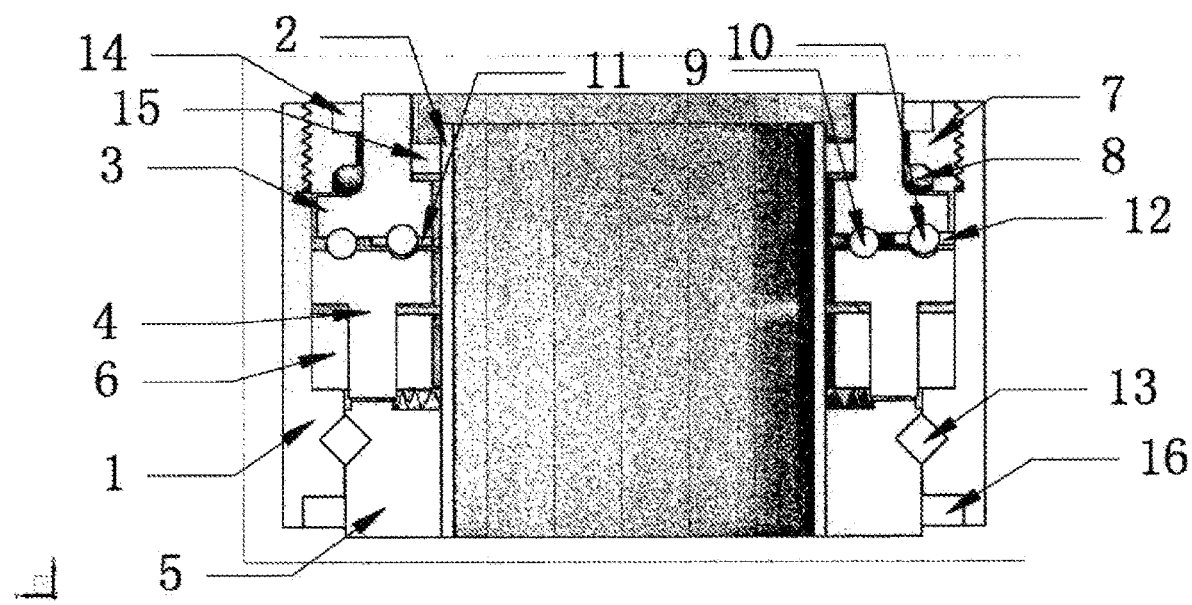
FIG. 1 is a cross-sectional view of the transmission in the YZ plane.
Figure 2:
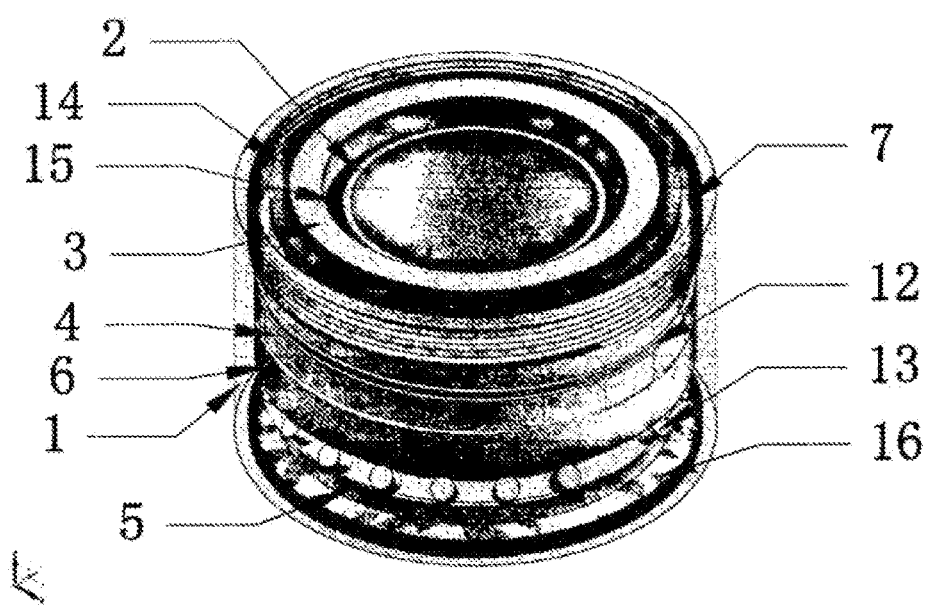
FIG. 2 is a perspective view of the transmission; a shell of the transmission is transparentized.
Figure 3:
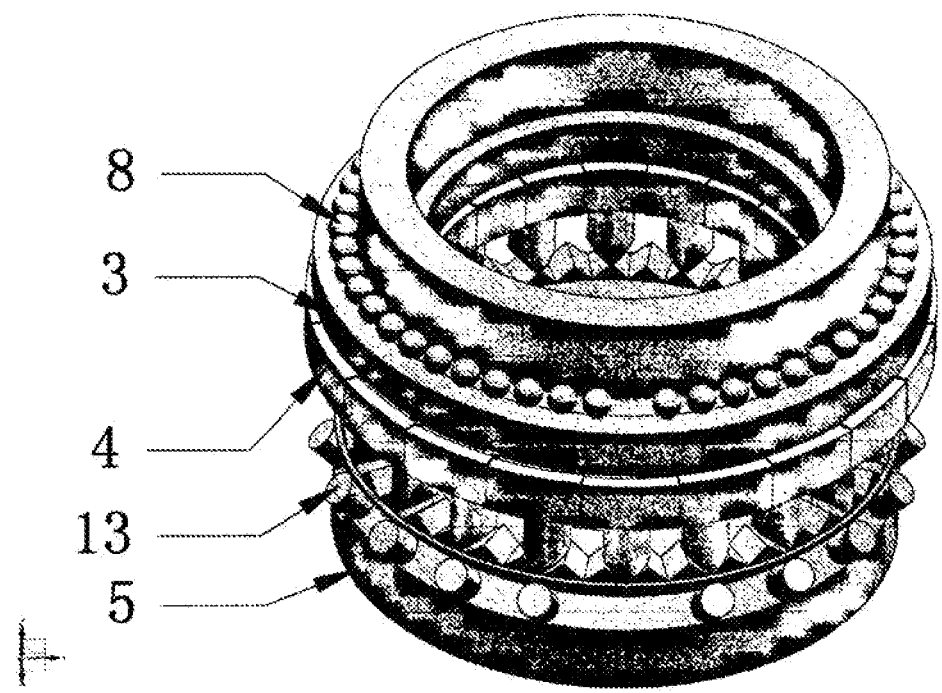
FIG. 3 is a perspective view of the transmission showing main components of the transmission.

The present disclosure will be further described below in conjunction with the accompanying drawings.

The present disclosure illustrates a typical structure.

1. A transmission, comprising an outer shell (1), an inner shell (2), a drive disk (3), a plurality of T-shaped teeth (4), a gear (5), a tooth seat (6), an adjustable nut (7), balls (8), inner balls (9), outer balls (10), an inner protective frame (11), an outer protective frame (12), rollers (13), a first sealing ring (14), a second sealing ring (15) and a third sealing ring (16).

2. An upper part of the outer shell (1) is provided with a thread, the thread fits the adjustable nut (7); a middle part of the outer shell (1) is rigidly connected with the tooth seat (6) as a whole, and a lower part of the outer shell (1) is provided with a roller raceway fitting the rollers (13).

3. An upper part of the inner shell (2) fits the second sealing ring (15), and a lower part of the inner shell (2) is fixed on the gear (5).

4. An upper part of the drive disk (3) fits the first sealing ring (14) and the second sealing ring (15); and a ball raceway is formed on an outside of a middle part of the drive disk (3) to fit the balls (8); a lower bottom surface of the drive disk (3) is provided with an inner raceway and an outer raceway; a part of the inner raceway is provided with the inner protective frame (11), and a part of the outer raceway is provided with the outer protective frame (12); the inner protective frame (11) faces to the outer protective frame (12); the inner balls (9) fit the inner raceway, the outer balls (10) fit the outer raceway.

5. The inner protective frame (11) and the outer protective frame (12) are provided on the drive disk (3) and configured to hold the inner balls (9) and the outer balls (10) and prevent the inner balls (9) and the outer balls (10) from contacting the T-shaped teeth (4).

6. The inner balls (9) fit the drive disk (3), and contact with the T-shaped teeth (4) in sections of the inner raceway without the inner protective frame; and the outer balls (10) fit the drive disk (3), and contact with the T-shaped teeth (4) in sections of the outer raceway without the outer protective frame.

7. A top of the T-shaped teeth (4) is provided with lower raceways, which fit the inner balls (9) and the outer balls (10); and a middle part of the T-shaped tooth (4) passes through and fits the tooth seat (6); and a lower end part of the T-shaped tooth (4) is a tooth with a cylindrical spiral surface, which meshes with the gear (5).

8. The gear (5) has teeth with cylindrical spiral surface, which meshes with the T-shaped teeth (4), and an outside of a middle part of the gear (5) is provided with a roller raceway, which fits the rollers (13), and an outside of a lower part of the gear (5) fits the third sealing ring (16).

9. The adjustable nut (7) fits the outer shell (1), the first sealing ring (14), and the balls (8); transmission clearance of all transmission components in the transmission is capable of being adjusted by rotating the adjustable nut (7).

10. Characteristic curves of sections of the inner raceway without the inner protective frame, sections of the outer raceway without the outer protective frame and lower raceways on the T-shaped tooth (4) are cylindrical helical curves; the inner raceway and the outer raceway have different rotation directions and same pitch; sections of the inner raceway provided with the inner protective frame and sections of the outer raceway provided with the outer protective frame are smoothly raised, and respectively fit the inner protective frame and the outer protective frame, such that the inner balls at the sections of the inner raceway without the inner protective frame and the outer balls at the sections of the outer raceway without the outer protective frame smoothly rise and get out of contact with the T-shaped teeth (4).

11. When a number of the T-shaped teeth (4) is n, a number of teeth of the gear (5) is 2n+1 or 2n−1; a rotation direction of the gear (5) with the number of teeth of 2n+1 is different from a rotation direction of the gear (5) with the number of teeth of 2n−1.

12. The gear (5) and T-shaped tooth (4) have same tooth profile of cylindrical helix surface, and a pitch of the cylindrical helix surface is equal to a product of a pitch of a cylindrical helical curve of the drive disk (3) or the T-shaped tooth (4) and a number of teeth of the gear (5); and a speed ratio of the transmission is equal to the number of teeth of the gear (5).

Figure 4:
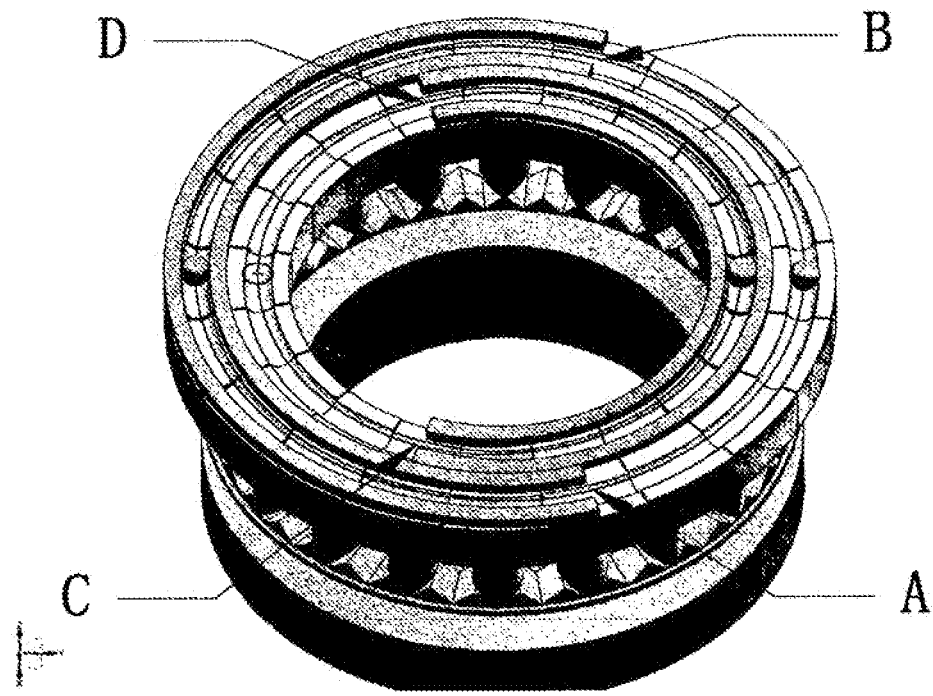
FIG. 4 is a diagram of the main components of the transmission; A, B, C, and D indicate the space curve transition points of the inner balls and outer balls.
Figure 5:
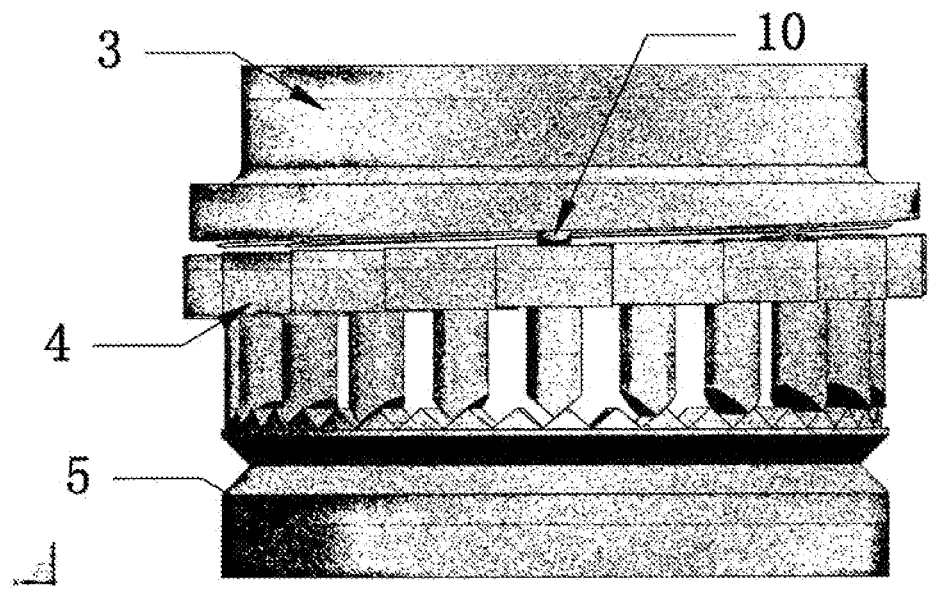
FIG. 5 is a diagram of the main components of the transmission; the operating principle of the transmission is easier to understand through this diagram.
Figure 6:
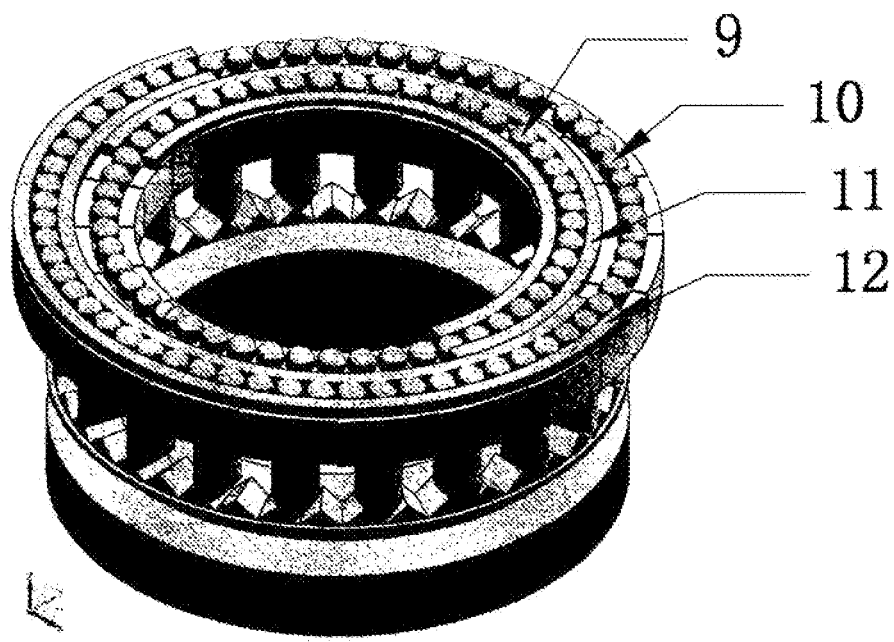
FIG. 6 is an actual arrangement diagram of the inner balls and the outer balls.
Figure 7:
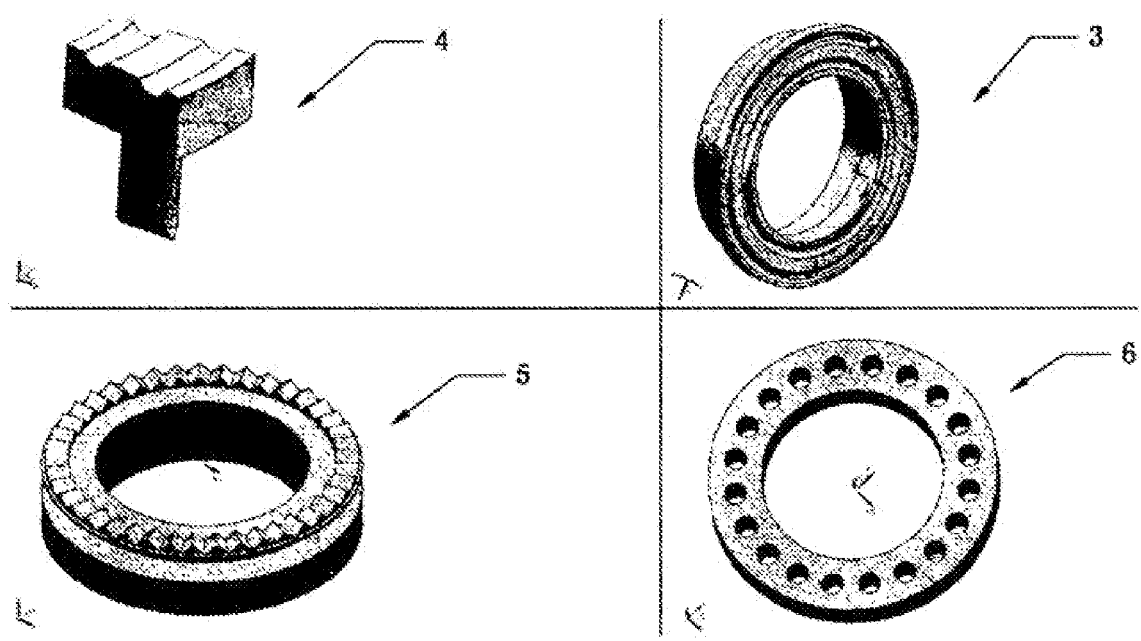
FIG. 7 is a diagram separately showing the main components.

As shown in FIGS. 1-7, when the drive disk (3) rotates counterclockwise, the outer ball (10) at front side has a downward sub-motion, and the sub-motion is transmitted to the T-shaped tooth (4). The T-shaped tooth (4) downward forces the gear (5) to rotate counterclockwise. While at back side, when the gear (5) rotates counterclockwise, the T-shaped tooth (4) is forced to move upwards, and the inner raceway ball (9) is forced by the T-shaped tooth (4) to move upwards and approach the drive disk (3). For ease of observation, only one outer ball is shown in FIG. 5, while FIG. 6 shows all inner and outer balls in the inner and outer raceways.

As shown in FIG. 1, the inner ball (9) at inner protective frame (11) on the left is held by the inner protective frame (11) and thus does not contact the T-shaped teeth (4). Here the driving motion is performed by the outer ball (10). At the outer protective frame (12) on the right, the driving motion is performed by the inner ball (9), and the outer ball (10) is lifted. As shown in FIG. 4, when the T-shaped tooth (4) is engaged with the gear (5), sections of the outer raceway on right side are smoothly aligned between two T-shaped teeth, while the ones on the left are stepped, the inner raceway is just opposite to the outer raceway. Therefore, only the smooth aligned sections can be used to run the balls for transmission. In order to make the transmission run more smoothly, only the AB section of the outer raceway and the CD section of the inner raceway are used for transmission, and the sections provided with inner protective frame or outer protective frame does not participate in the transmission. Curve AB and curve CD are the characteristic curves of the inner and outer raceways. They are all cylindrical helical curves with equal pitch and opposite rotation direction. For example, when the curve AB is dextrorotary, the curve CD is levorotatory. The raceway curve at the sections provided with inner protective frame or outer protective frame is required to smoothly connected to the raceway curve at sections without the inner protective frame or outer protective frame, and the inner balls and outer balls are guided to get out of contact with the T-shaped teeth, and there is no strict mathematical requirement. The rotation directions of the inner raceway and outer raceway on the T-shaped tooth (4) are opposite, so at any time, only one of the two raceways participates in the transmission. The surface of the T-shaped teeth (4) meshing with the gear (5) is a cylindrical spiral surface, and the meshing of the T-shaped tooth and the gear is a real surface meshing, as shown in FIG. 5. The pitch of the cylindrical spiral surface is equal to the product of the pitch of the cylindrical helical curve of the raceway on the T-shaped tooth (4) and the number of teeth of the gear (5).

In the transmission of the present disclosure, the balls (8) is first pressed by adjusting the adjustable nut (7), and then the balls (8) press the drive disk (3), and the drive disk (3) presses the inner balls (9) and the outer balls (10), and the inner balls (9) and the outer balls (10) press the T-shaped teeth (4), and the T-shaped teeth (4) press the gear (5) and the tooth seat (6), and the gear (5) presses the rollers (13), and the rollers (13) press the outer shell (1) to complete the force transmission return. The transmission clearance of all components is eliminated. After the transmission is manufactured, the adjustable nut (7) is gradually tightened for running-in. The accuracy of the transmission can be improved through self-running-in, thereby reducing the requirements for manufacturing accuracy. In the course of use, the clearance can be adjusted to offset the wear as needed, such that the service life is much higher than that of other precision transmissions.

In the transmission of the present disclosure, all components are arranged far away from the center, the structure is simple and compact, the force transmission distance is short, and the rigidity is high. A large hollow structure can be realized, which is very convenient for wiring and laying pipes at the robot joints. For precision multi-axis machine tools, more types of workpieces or components can be installed.

In the transmission of the present disclosure, all the ball components mentioned can be modified into roller components when needed. The inner raceway and the outer raceway can be made into multi-row raceways when needed, and the transmission principle is the same.

The invention claimed is:

1. A transmission, comprising an outer shell (1), an inner shell (2), a drive disk (3), a plurality of T-shaped teeth (4), a gear (5), a tooth seat (6), an adjustable nut (7), balls (8), inner balls (9), outer balls (10), an inner protective frame (11), an outer protective frame (12), rollers (13), a first sealing ring (14), a second sealing ring (15) and a third sealing ring (16);

wherein an upper part of the outer shell (1) is provided with a thread, the thread fits the adjustable nut (7); a middle part of the outer shell (1) is rigidly connected with the tooth seat (6) as a whole, and a lower part of the outer shell (1) is provided with a roller raceway fitting the rollers (13);

an upper part of the inner shell (2) fits the second sealing ring (15), and a lower part of the inner shell (2) is fixed on the gear (5);

wherein an upper part of the drive disk (3) fits the first sealing ring_(14) and the second sealing ring (15); and a ball raceway is formed on an outside of a middle part of the drive disk (3) to fit the balls (8); a lower bottom surface of the drive disk (3) is provided with an inner raceway and an outer raceway; apart of the inner raceway is provided with the inner protective frame (11), and a part of the outer raceway is provided with the outer protective frame (12); the inner protective frame (11) faces to the outer protective frame (12); the inner balls (9) fit the inner raceway, the outer balls (10) fit the outer raceway characteristic curves of sections of the inner raceway without the inner protective frame (11) and sections of the outer raceway without the outer protective frame (12) are cylindrical helical curves; sections of the inner raceway provided with the inner protective frame and sections of the outer raceway provided with the outer protective frame are smoothly and tangentially connected to the cylindrical helical curves, and the inner balls and outer balls are guided to get out of contact with the T-shaped teeth (4);

wherein the inner protective frame (11) and the outer protective frame (12) are provided on the drive disk (3) and configured to hold the inner balls (9) and the outer balls (10) and prevent the inner balls (9) and the outer balls (10) from contacting the T-shaped teeth (4);

the inner balls (9) fit the drive disk (3), and contact with the T-shaped teeth (4) in sections of the inner raceway without the inner protective frame; and the outer balls (10) fit the drive disk (3), and contact with the T-shaped teeth (4) in sections of the outer raceway without the outer protective frame;

a top of the T-shaped teeth (4) is provided with lower raceways, which fit the inner balls (9) and the outer balls (10); and a middle part of the T-shaped tooth (4) passes through and fits the tooth seat (6); and a lower end art of the T-shaped tooth 4 is a tooth with a cylindrical spiral surface which meshes with the gear (5);

the gear (5) has teeth with a cylindrical spiral surface, which meshes with the T-shaped teeth (4) and an outside of a middle part of the gear (5) is provided with a roller raceway, which fits the rollers (13), and an outside of a lower part of the gear (5) fits the third sealing ring (16);

the adjustable nut (7) fits the outer shell (1) the first sealing ring (14) and the balls (8); transmission clearance of all transmission components in the transmission is capable of being adjusted by rotating the adjustable nut (7);

characteristic curves of sections of the inner raceway without the inner protective frame, sections of the outer raceway without the outer protective frame and lower raceways on the T-shaped tooth (4) are cylindrical helical curves; the inner raceway and the outer raceway have different rotation directions and the same pitch; sections of the inner raceway provided with the inner protective frame and sections of the outer raceway provided with the outer protective frame are smoothly raised, and respectively fit the inner protective frame and the outer protective frame, such that the inner balls at the sections of the inner raceway without the inner protective frame and the outer balls at the sections of the outer raceway without the outer protective frame smoothly rise and get out of contact with the T-shaped teeth (4);

the teeth of the gear (5) and the T-shaped tooth (4) are identical, both being cylindrical helix surfaces; a pitch of the cylindrical helix surface is equal to a product of a pitch of a cylindrical helical curve of the drive disk (3) or the T-shaped tooth (4) and a number of teeth of the gear (5); and a transmission ratio of the transmission is equal to the number of teeth of the gear (5).

2. The transmission of claim 1, when a number of the T-shaped teeth (4) is n, a number of teeth of the gear (5) is 2n+1 or 2n−1; a rotation direction of the gear (5) with the number of teeth of 2n+1 is different from a rotation direction of the gear (5) with the number of teeth of 2n−1.

\* \* \* \* \*